(12) United States Patent
Argue et al.

(10) Patent No.: US 8,788,352 B2
(45) Date of Patent: Jul. 22, 2014

(54) GIFT-REGISTRY APPARATUS AND METHOD

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: Wal-Mart Stores, Inc., Bentonville, AR (US)

(*) Notice: Subject to any disclaimer, the term of this patent is extended or adjusted under 35 U.S.C. 154(b) by 0 days.

(21) Appl. No.: 13/688,121

(22) Filed: Nov. 28, 2012

(65) Prior Publication Data
US 2014/0149238 A1      May 29, 2014

(51) Int. Cl.
*G06G 1/12*       (2006.01)
*G06Q 30/00*      (2012.01)

(52) U.S. Cl.
USPC ............................................. 705/21; 705/26

(58) Field of Classification Search
USPC ........................................................ 705/21
See application file for complete search history.

(56) References Cited

U.S. PATENT DOCUMENTS

| | | | |
|---|---|---|---|
| 6,587,835 B1 * | 7/2003 | Treyz et al. | 705/14.64 |
| 7,848,960 B2 * | 12/2010 | Rampell et al. | 705/26.1 |
| 8,036,953 B2 * | 10/2011 | Hsu et al. | 705/27.1 |
| 8,346,626 B2 * | 1/2013 | Robertson | 705/26.8 |
| 8,483,668 B2 * | 7/2013 | Hurowitz et al. | 455/414.1 |

* cited by examiner

*Primary Examiner* — Garcia Ade
(74) *Attorney, Agent, or Firm* — David R. Stevens; Stevens Law Group (57) ABSTRACT

A method is disclosed for administering a gift registry. Within the method, a computer system may associate or link a gift registry to a computing device in the possession of a customer. A point-of-sale system forming part of the computer system may then initiate a transaction comprising the purchase of an item by the customer. The computer system may identify a link between the computing device and the transaction, determine that the item is listed within the gift registry, and receive confirmation that the item was purchased for the gift registry. Accordingly, the computer system may modify the gift registry to reflect the purchase of the item.

20 Claims, 8 Drawing Sheets

GIFT-REGISTRY APPARATUS AND METHOD

BACKGROUND

1. Field of the Invention

This invention relates to point-of-sale systems and more particularly to systems and methods for using electronic receipt data collected at a point-of-sale system to assist in managing a gift registry.

2. Background of the Invention

Many point-of-sale (POS) systems currently in use today do not support important emerging technologies, services, and marketing opportunities. For example, many POS systems are limited in their ability to collect and analyze electronic receipt data. As a result, those POS systems cannot effectively implement many novel methods and services surrounding such data. Accordingly, what is needed is an apparatus and method expanding the ability of a wide variety of POS systems and supporting computer systems, include legacy POS systems, to use electronic receipt data to benefit customers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
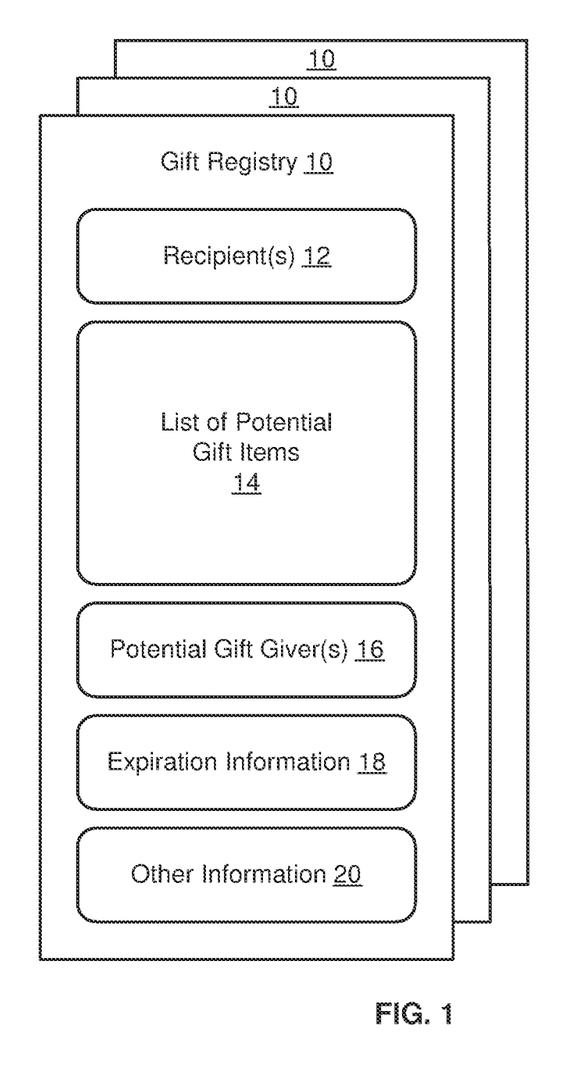
FIG. 1 is a schematic block diagram of one embodiment of a gift registry in accordance with the present invention.

Referring to FIG. 1, in selected embodiments, one or more computers, computers systems, mobile computing devices, or the like or a combination or sub-combination thereof may support, enable, or administer one or more gift registries 10. A gift registry 10 may be viewed as a "wish list." In a typical wish list, a recipient 12 may compile a list of items 14 he or she would like to receive as gifts. The resulting wish list may then be distributed to family, friends, or the like (e.g., potential gift givers 16) in anticipation of some gifting event (e.g., holiday, birthday, wedding, anniversary, or the like).

A gift registry 10 may be public or private. For example, in selected embodiments, a gift registry 10 may be limited to selected individuals 16 or entities 16 identified and/or selected by a recipient 12. A gift registry 10 may typically be limited to the stock of a given retailer. However, a gift registry 10 may extend across multiple retailers or vendors. In certain embodiments, one or more retailers may maintain a list 14 for a recipient 12 and ensure that items are removed from the list 14 as they are purchased.

A gift registry 10 may provide certain benefits. For example, a gift registry 10 may improve communication between recipients 12 and gift givers 16. Thus, gift givers 16 may be sure they are purchasing items that the recipient 12 needs and/or wants. A gift registry 10 may also prevent gift givers 16 from duplicating gifts.

Participants 16 in a gift registry 10 may enjoy certain anonymity. For example, a gift registry 10 may enable a gift giver 16 to purchase a relevant gift without divulging that he or she will be purchasing a gift and without any potentially revealing inquiries regarding the needs or wants of a recipient 12. A gift registry 10 may also benefit a retailer by bring customers thereto.

In selected embodiments, one or more computers, computers systems, mobile computing devices, or the like or a combination or sub-combination thereof may generate, access, modify, or update one or more records of one or more gift registries 10. Such records may provide the information necessary or desired for proper administration of the corresponding gift registry 10. In selected embodiments, the records corresponding to a gift registry 10 may identify one or more recipients 12 (e.g., an individual, couple, or the like acting as registrants in initiating, and/or comprising beneficiaries of, a corresponding gift registry 10), one or more potential gift items 14 needed or desired by the recipients 12, one or more potential gift givers 16 to whom the corresponding gift registry 10 may be communicated or shared, expiration information 18 (e.g., information defining how long a retailer or other entity will maintain a corresponding gift registry 10), other information 20, or the like or a combination or sub-combination thereof.

Certain embodiments in accordance with the present invention may provide or support certain recipient-created alternatives within the potential gift items 14. That is, a recipient 12 may be satisfied with a Brand A item or a similar or equivalent item sold under Brand B. Accordingly, in creating a gift registry 10, a recipient 12 may create an alternative. For example, the recipient 12 may, in effect, list "a BREVILLE toaster or a TOASTMASTER toaster" as a potential gift 14. Thus, a potential gift giver 16 may choose which to purchase for the registry 12. Moreover, when a potential gift giver 16 purchases one of the items forming part of the substitutable set, both items may be removed from the registry 10.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
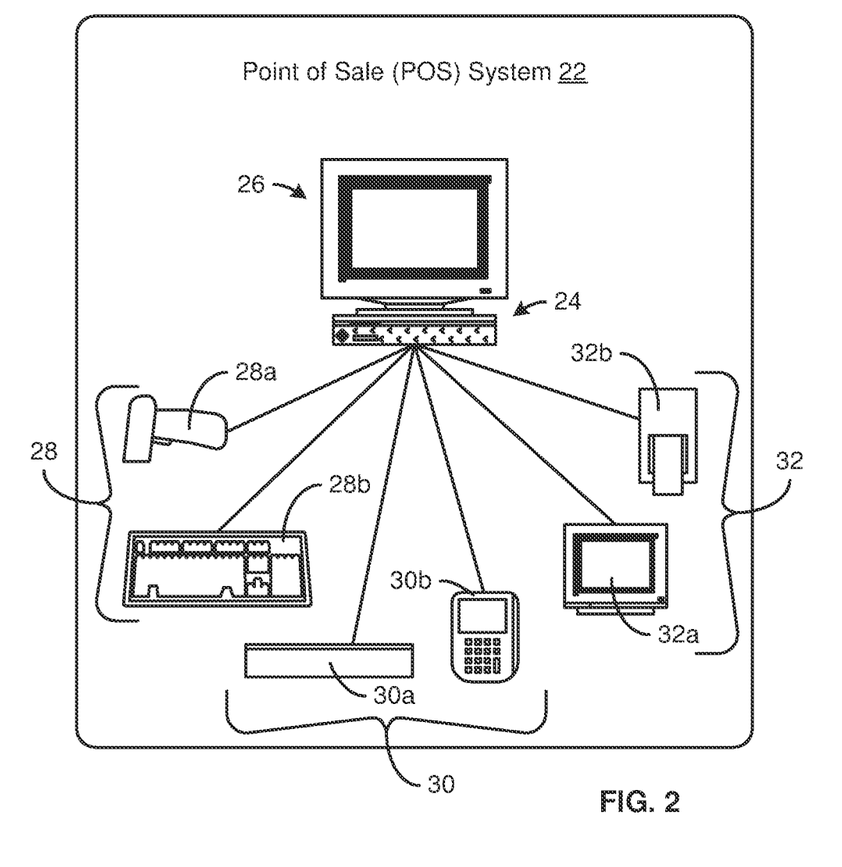
FIG. 2 is a schematic block diagram of one embodiment of a point-of-sale (POS) system for implement methods in accordance with the present invention.

Referring to FIG. 2, in selected embodiments, the hardware, software, or hardware and software of a POS system 22 may be configured to implement one or more methods in accordance with the present invention. For example, a POS system 22 may be manufactured, programmed, modified, or upgraded to collect and pass receipt data that can be used to support a gift registry 10.

A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 3:
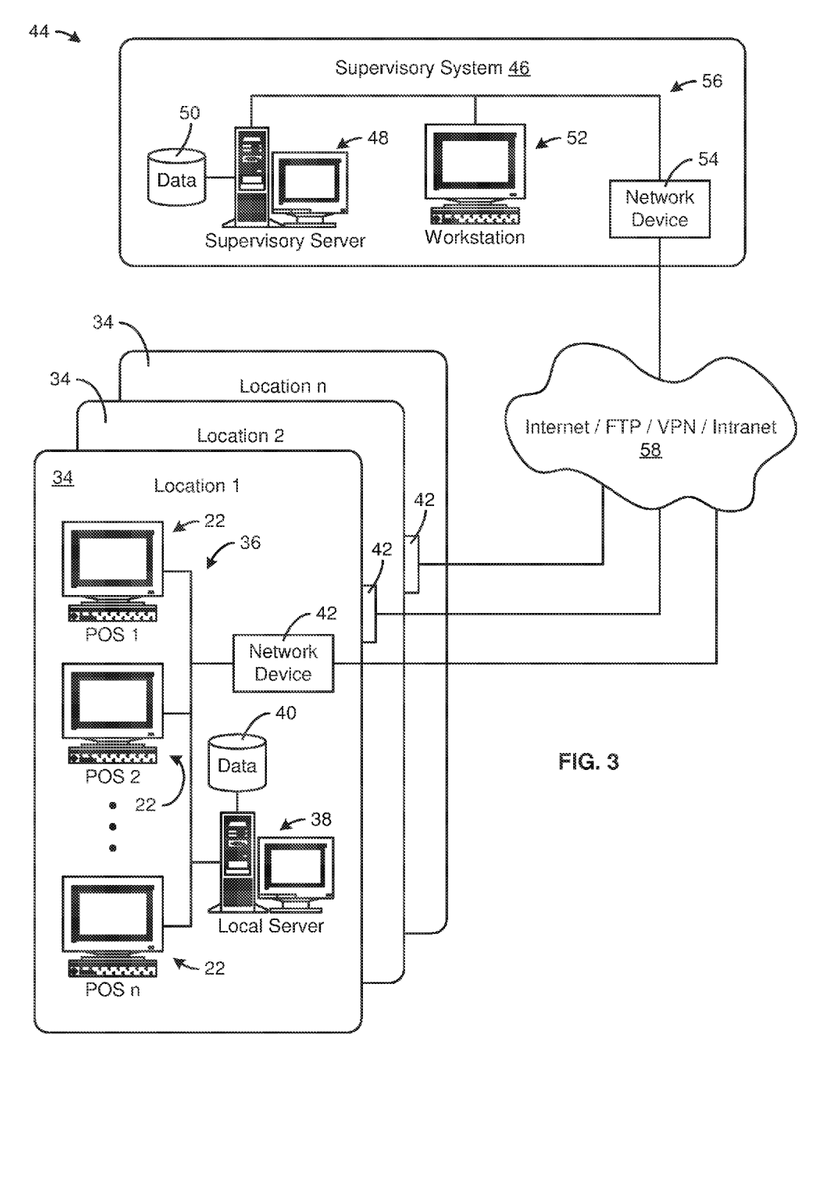
FIG. 3 is a schematic block diagram of one embodiment of multiple POS systems in accordance with the present invention operating in the context of an enterprise-wide system.

Referring to FIG. 3, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

Figure 4:
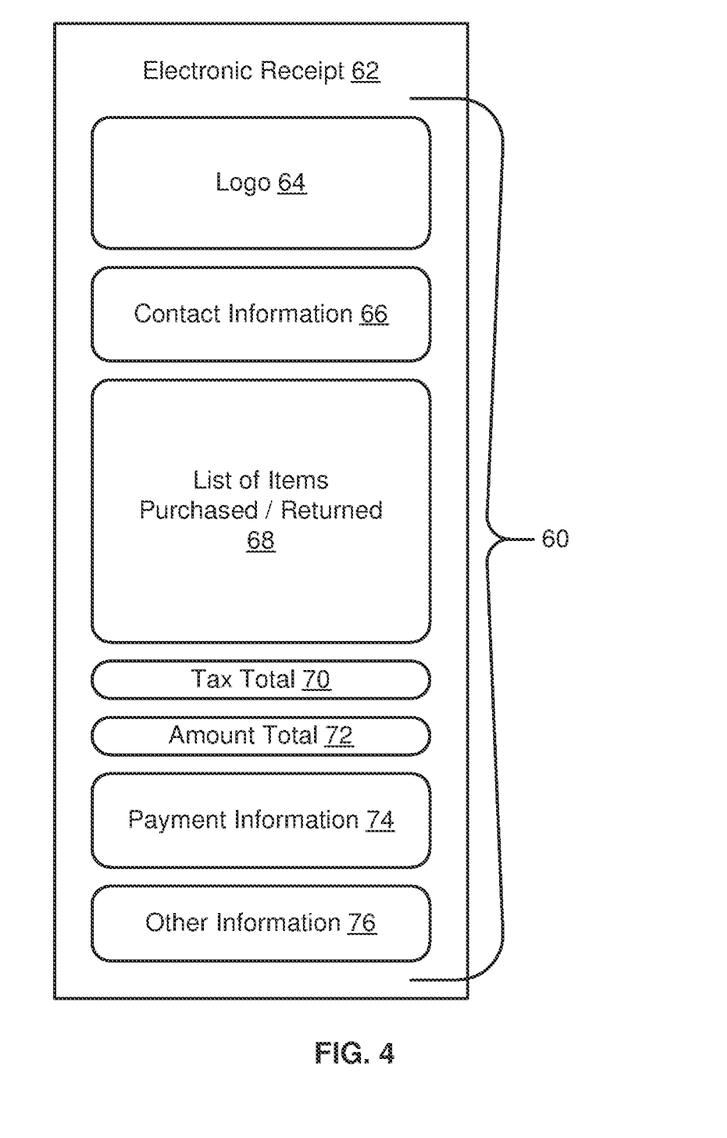
FIG. 4 is a schematic block diagram of one embodiment of receipt in accordance with the present invention.

Referring to FIG. 4, a POS system 22 may collect and/or generate receipt data 60. Receipt data 60 may document a transaction (e.g., sale or return) carried out by a POS system 22. Receipt data 60 may be presented or displayed to a customer in the form of an electronic (e.g., paperless) receipt 62. In selected embodiments, receipt data 60 may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

In selected embodiments, receipt data 60 and an electronic receipt 62 may include a logo 64, contact information 66, a list 68 of items purchased or returned, a total 70 indicating the sales tax assessed or returned, a total 72 indicating the amount paid or returned, payment information 74, other information 76, or the like or combinations or sub-combinations thereof.

A logo 64 may reinforce the brand and image of the associated entity within the mind of a consumer. By including contact information 66 on an electronic receipt 62, an entity may ensure that a customer has ready access to one or more physical addresses, Internet address, telephone numbers, facsimile numbers, hours of operation, or the like or combinations or sub-combinations thereof. One or more of a list 68 of items purchased or returned, a total 70 indicating the sales tax assessed or returned, a total 72 indicating the amount paid or returned, and payment information 74 (e.g., date of transaction, an indication of method of payment, an indication of which credit or debit card was used, etc.) may be included to document important details of a transaction.

Other information 76 may be included within an electronic receipt 62 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

An electronic receipt 62 may be presented by a computing device of a customer in any suitable layout or format. For example, the receipt data 60 forming an electronic receipt 62 may simply be presented as a textual list. Alternatively, an electronic receipt 62 may follow the form of a paper receipt. That is, the electronic receipt 62 may comprise a virtual representation or layout substantially matching what a comparable paper receipt would look like.

The manner in which an electronic receipt 62 is presented or displayed on a computing device of a customer may be completely dictated by the computer system delivering the receipt data 60 thereto. Alternatively, the computing device of the customer may have an application (e.g., a receipt manager, accounting program, budgeting program, or the like) installed thereon. Such an application may partially or completely control the layout or format of an electronic receipt 62 displayed therewith or therethrough. For example, a computer system may supply receipt data 60, while the application installed on the computing device of the customer supplies the layout or formatting.

Figure 5:
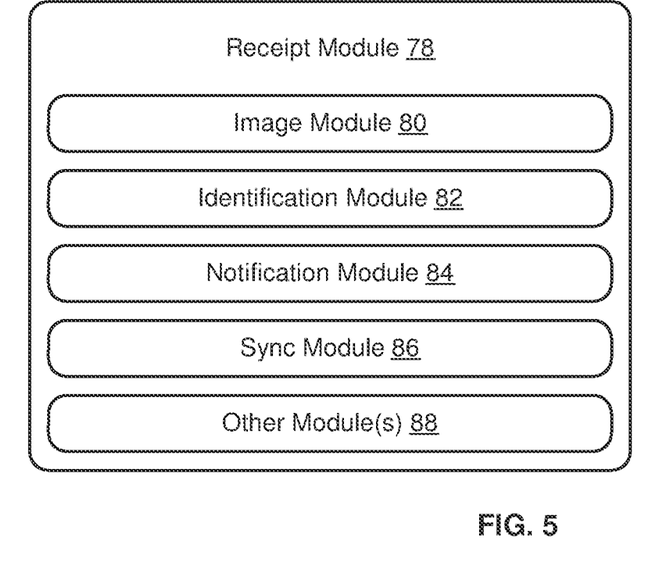
FIG. 5 is a schematic block diagram of one embodiment of a receipt module in accordance with the present invention.

Referring to FIG. 5, a computer system in accordance with the present invention may deliver receipt data 60 to a computing device of a customer in any suitable manner. In selected embodiments, a receipt module 78 may enable or support such delivery. A receipt module 78 may include any suitable arrangement of sub-components or modules. In certain embodiments, a receipt module 78 may include an image module 80, identification module 82, notification module 84, synchronization module 86, one or more other modules 88 as desired or necessary, or the like or some combination or sub-combination thereof.

An image module 80 may assemble, generate, or obtain an advertisement comprising a call to action. A call to action may invite or motivate a customer to take a particular step or action. For example, a call to action may invite or motive a consumer to download receipt data 60. To increase the likelihood that a consumer will respond favorably to the call to action, an advertisement may include an enabler facilitating the desired step or action. For example, in selected embodiments, an advertisement may include a machine-readable code. By scanning the code (e.g., scanning the code using a camera on a mobile telephone, tablet computer, or the like), a consumer may import receipt data 60 encoded within the code. Alternatively, scanning the code may initiate the download of receipt data 60.

For example, a machine-readable code may be encoded with a URL. In addition to designating a particular resource, a URL may also include a transaction identification (ID). Accordingly, after an appropriate application is launched and a machine-readable code is scanned, a URL may be passed from a customer (e.g., from a mobile telephone of a customer) to an Internet Service Provider (e.g., a telecommunications provider). As a result, an appropriate resource within a computer system may be accessed and receipt data may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 82 may be tasked with requesting, collecting, and/or communicating identification information linking a customer associated with a transaction with one or more records stored within a computer system. For example, as part of a transaction carried out at a POS system 22, an identification module 82 may request, collect, and/or communicate identification information linking a transaction to a particular computing device corresponding to the customer participating in the transaction. Thus, information corresponding to the transaction may be passed to the customer via the particular computing device.

An identification module 82 may request, collect, and/or communicate one or more types of identification information. For example, in selected embodiments, an identification module 82 may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number, payment number, membership number, or the like at a POS system 22. For example, while a cashier is processing a transaction, a customer may be prompted via a card reader 30b, customer-facing display 32a, or the like to enter (e.g., type in using the card reader 30b) a mobile telephone number corresponding to the customer. Alternatively, a cashier may type in a telephone number corresponding to the customer.

Once the identification information is received, it may be used directly (e.g., used directly to pass receipt data 60 to a computing device of a corresponding customer). Alternatively, or in addition thereto, the identification information may tie or link a current transaction to one or more previously stored computer records. For example, within such records, a computer system may find the information necessary to identify and communicate with a computing device of a corresponding customer. Alternatively, or in addition thereto, such records may enable a computer system to tie or link a current transaction to an appropriate computing device, one or more gift registries 10 to which the current customer is a member, or the like or a combination or sub-combination thereof.

A notification module 84 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt 62 is available for download).

A synchronization module 86 may support or enable one way or two way data communication between a computer system and a computing device. For example, a synchronization module 86 may support or enable the passing of receipt data 60 from a computer system to a computing device. A synchronization module 86 may also enable certain data received from a computing device to be incorporated within or used by a computer system. For example, one or more user preferences (e.g., notification preferences) may be communicated to a computer system from an application resident on a computing device.

The various functions or modules of a receipt module 78 may be enacted or implemented by any suitable system or component thereof. For example, in selected embodiments, one or more functions or modules of a receipt module 78 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 6:
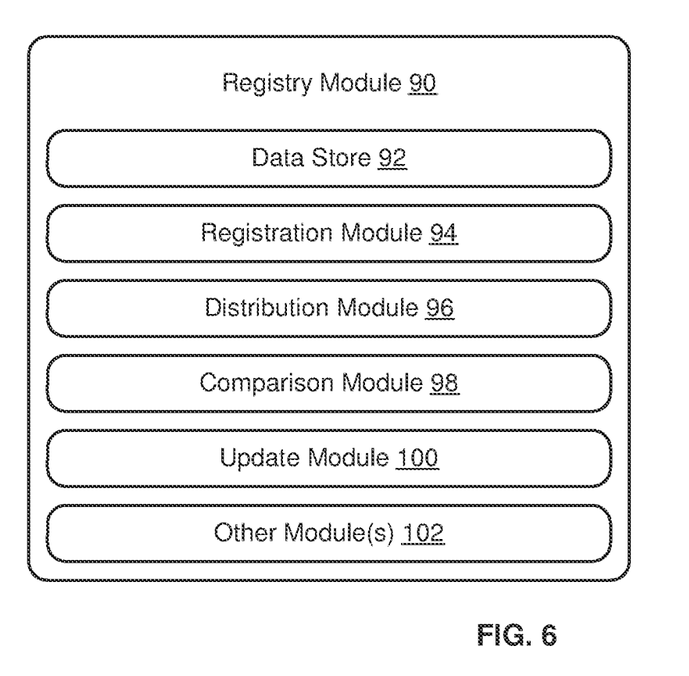
FIG. 6 is a schematic block diagram of one embodiment of a registry module in accordance with the present invention.

Referring to FIG. 6, in selected embodiments, one or more computers, computers systems, mobile computing devices, or the like or a combination or sub-combination thereof may support or enable a registry module 90. A registry module 90 may administer, or support the administration of, one or more gift registries 10. A registry module 90 may include any suitable arrangement of sub-components or modules. In certain embodiments, a registry module 90 may include a data store 92, registration module 94, distribution module 96, comparison module 98, update module 100, one or more other modules 102 as desired or necessary, or the like or some combination or sub-combination thereof.

A data store 92 may contain records corresponding to the operation or maintenance of one or more gift registries 10. For example, in selected embodiments, a data store 92 may contain records corresponding to one or more recipients 12, one or more potential gift items 14 needed or desired by the recipients 12, one or more potential gift givers 16 to whom the corresponding gift registry 10 may be communicated or shared, expiration information 18, other information 20, or the like or a combination or sub-combination thereof.

A registration module 94 may enable one or more recipients 12 to initiate a gift registry 10. For example, a registration module 94 may collected various information from one or more recipients 12 and pass it to a data store 92 for later use or recall. In selected embodiments, a registration module 94 may receive information input by a recipient 12 into a web interface. For example, via a website hosted on the Internet, a recipient 12 may enter his or her name, the nature of the registry 10, information corresponding to one or more potential gift givers 16, or the like. Additionally, the recipient 12 may select or otherwise identify via the website one or more potential gifts 14 (e.g., browse or search online product listings and select those items he or she would like to list as part of the registry 10).

Alternatively, or in addition thereto, a registration module 94 may receive information input by a recipient 12 into a computing device corresponding thereto. For example, using an application running on his or her computing device, a recipient 12 may enter his or her name, the nature of the registry 10, information corresponding to one or more potential gift givers 16 (e.g., email addresses, mobile telephone numbers, or the like of one or more potential gift givers 16), or the like. Additionally, the recipient 12 may use a computing device and an application running thereon to scan in one or more potential gifts 14 (e.g., shop a brick-and-mortar store and scan barcodes or UPCs corresponding to items he or she would like to list as part of the registry 10).

In still other embodiments, a registration module 94 may enable a clerk or other business associate within a brick-and-mortar store to enter certain information provided by a recipient 12 and import a list of potential gift items 14 (e.g., import a list of potential gift items 14 collected by a scanner loaned by the store to the recipient 12 to enable the recipient to shop a brick-and-mortar store and scan barcodes or UPCs corresponding to items he or she would like to list as part of the registry 10).

A distribution module 96 may support a recipient 12 in his or her efforts to inform one or more relatives, friends, etc. (e.g., one or more potential gift givers 16) about a corresponding gift registry 10. For example, in selected embodiments, a distribution module 96 may output a unique identification number, code (e.g., two-dimensional barcode), or the like that a recipient may distribute to his or her family and friends. By scanning or entering such numbers, codes, or the like using an appropriate application on his or her computing device, a potential gift giver 16 may join a gift registry 10.

Alternatively, or in addition thereto, a distribution module 96 may send one or more electronic communications inviting one or more potential gift givers 16 to join or participate in a gift registry 10. For example, in selected embodiments, a recipient 12 may provide the email address, mobile telephone numbers, or the like of one or more potential gift givers 16. Accordingly, a distribution module 96 may use such identifying information to contact the potential gift givers 16.

In certain situations, an email address, mobile telephone number, or the like will corresponding to a computing device that already has a corresponding application (e.g., a retailer's mobile application, an electronic receipts application, or the like or a combination thereof) installed. In such situations, the potential gift givers 16 may be contacted (e.g., invited to join a corresponding gift registry 10) via the application or a notification (e.g., push notification) corresponding to the application. Alternatively, a distribution module 96 may send an email message or the like inviting a potential gift giver 16 to click on a link, download a corresponding application, join a corresponding registry 10, or the like or a combination or sub-combination thereof.

A comparison module 98 may assist in determining when a particular item should be "removed" from a particular gift registry 10. In selected embodiments, a comparison module 98 may compare certain receipt data 60 to one or more corresponding gift registries 10. For example, a particular customer may have joined (e.g., as a potential gift giver 16) one or more gift registries 10. Accordingly, a comparison module 98 may compare one or more items whose purchase is documented within receipt data 60 of that customer to the one or more potential gifts 14 corresponding to the one or more gift registries 10. This may be done in any suitable manner.

For example, in selected embodiments, a comparison module 98 may compare UPCs or UPC data. Alternatively, one or more retailer-specific numbers or identification codes may be used to make a comparison. In still other embodiments, a comparison module 98 may use a fuzzy search or comparison (e.g., a fuzzy comparison of descriptive text such as product names, weights, etc.). In selected embodiments, a fuzzy comparison may enable or support certain gift-giver-initiated substitutions (e.g., when gift-giver-initiated substitutions are allowed or enabled during a registry configuration process). Accordingly, a Brand A ironing board may be properly removed from a corresponding registry even when it was a Brand B ironing board that was purchased by a potential gift giver 16.

Should a match exist (e.g., should an item purchased by the customer be an item listed as a potential gift 14 on a relevant gift registry 10), then a comparison module 98 may inquire of the customer (e.g., inquire via an appropriate application running on the customer's computing device) whether the item was purchased for a particular registry 10. If the customer responds in the affirmative, then a comparison module 98 may inform an update module 100 that the item may be removed from the corresponding gift registry 10.

An update module 100 may ensure that actions relevant to one or more gift registries 10 may be properly reflected therein. For example, an update module 100 may enable a recipient 12 to modify (e.g., add or remove a potential gift 14, add a potential gift giver 16, or the like) a gift registry 10 corresponding thereto. Alternatively, or in addition thereto, an update module 100 may update a gift registry 10 whenever a gift corresponding thereto has been purchased. For example, an update module 100 may remove an item from a list of potential gift items 14 once the item has been purchased by a gift giver 16.

Such removal may be accomplished in any suitable manner. For example, in selected embodiments, an update module may delete an item from a corresponding list of potential gift items 14. Alternatively, an update module 100 may change the status of an item once it has been purchased. For example, before an item is purchased, it may have a status indicator reflecting that unpurchased status. Items with such a status may be displayed or otherwise communicated to potential gift givers 16. However, once an item is purchased for a gift registry 10, a status indicator may be changed to reflect that purchased status. Items with such a status may not be display or communicated to potential gift givers 16, thereby lowering the risk of a duplicate gift purchase for a particular recipient 12.

An update module 100 may ensure that the registry data view by the various potential gift givers 16 is kept up to date. For example, when a potential gift giver 16 decides to view a list of potential gift items 14, an update module 100 may ensure that the list is current. This may be accomplished in any suitable manner. In selected embodiments, this may be accomplished maintaining a master list of potential gift items 14 on one or more servers within a computer system. Accordingly, any time an application (e.g., an application running on a computing device) needs to display a list of potential gift items 14 to a potential gift giver 16, it may pull down a fresh, current copy of the master list.

An update module 100 may cooperate with a notification module 84 in sending one or more notifications (e.g., push notifications) to potential gift givers 16. In selected embodiments, an update module 100 may work with a notification module 84 to send a notification to all potential gift givers 10 corresponding to a particular gift registry 10 whenever a gift is purchased for that registry 10. Such notifications may identify the gift purchased. Alternatively, or in addition thereto, such notifications may identify the purchaser of the gift. For example, a notification may communicate that "Phil just purchased the KITCHENAID mixer for Bill and Mary's wedding gift registry."

In selected embodiments, an update module 100 may provide reminders to one or more gift givers 16 as a particular gift-giving event approaches. For example, an update module 100 may cooperate with a notification module 84 in sending one or more notifications (e.g., push notifications) to a potential gift giver 16 reminding him or her that a particular gift-giving event is approaching and that he or she has not yet purchased a corresponding gift. In selected embodiments, a reminder feature may be a preference selected by a recipient 12 in creating a registry 10 or by a potential gift giver 16 (e.g., a feature selected by a potential gift giver 16 when joining a particular registry 10).

The various functions or modules of a registry module 90 may be enacted or implemented by any suitable system or component thereof. For example, in selected embodiments, one or more functions or modules of a registry module 90 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 7:
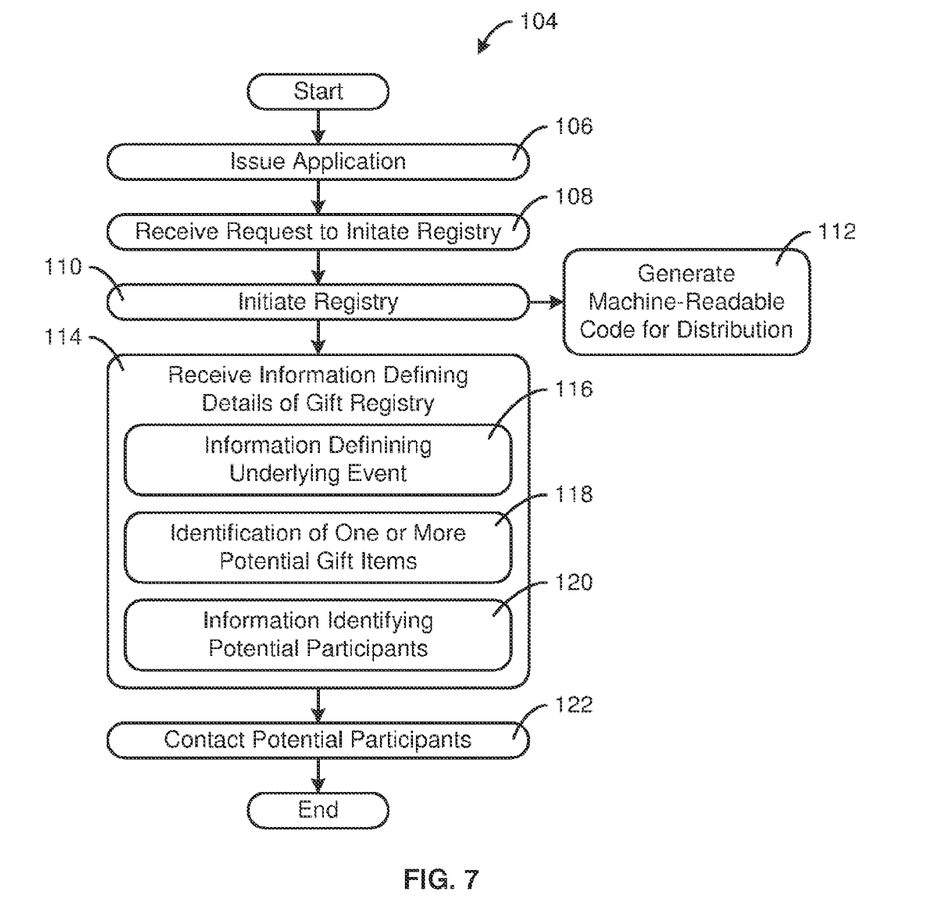
FIG. 7 is a block diagram of one embodiment of a method for creating a gift registry in accordance with the present invention.

Referring to FIG. 7, one method 104 in accordance with the present invention may begin when an appropriate application (e.g., a retailer's mobile application, an electronic receipts application, a gift registry application, or the like or a combination or sub-combination thereof) is issued 106 and made available for installation on one or more computing devices. A customer may then become a recipient 12 by initiating a gift registry 10. This may occur in any suitable manner. For example, in selected embodiments, a recipient 12 may initiate a gift registry 10 by contacting a clerk or associate at a store. Alternatively, a recipient 12 may initiate a gift registry 10 via a web interface, an application running on his or her computing device, or the like. Thus, in some form, a computer system may receive 108 from a recipient 12 a request to initiate a gift registry 10. Accordingly, a computer system may initiate 110 a gift registry 10.

In selected embodiments, after a gift registry 10 has been initiated 110, a computer system may generate 112 a machine-readable code for distribution. A machine-readable code (e.g., a barcode, two-dimensional barcode, QR code, or the like) may provide a mechanism through which a potential gift giver 16 may join a gift registry 10. For example, by scanning a machine-readable code with his or her computing device, a potential gift giver 16 may launch an appropriate application, be directed to a location to where an appropriate application may be downloaded, join a gift registry 10 (e.g., when the machine-readable code is scanning using an appropriate application running on the computing device), or the like. In selected embodiments, multiple (e.g., two) scans of a machine-readable code may be necessary for a potential gift giver 16 to join a gift registry 10. For example, a first scan of a machine-readable code may assist in obtaining an appropriate application on a computing device, while a second scan using the application may add the potential gift giver 16 to a corresponding gift registry 10.

A machine-readable code so generated 112 may be distributed in any suitable method. For example, an invitation to a gift-giving event (e.g., wedding reception, wedding shower, baby shower, or the like) may include a print out of the machine-readable code. Alternatively, or in addition thereto, a recipient 12 may distribute other mechanisms or information enabling a potential gift giver 16 to join a gift registry. For example, a recipient 12 may distribute a hyperlink, unique name, unique number, unique character string, or the like. By activating such a hyperlink or entering such a name, number, character string, or the like, a potential gift giver 16 may join a corresponding gift registry 10.

After a gift registry 10 has been initiated 110, a computer system may receive 114 additional information from a recipient 12. Such information may assist in fleshing out the details of the particular gift registry 10. For example, in selected embodiments, a computer system may receive 114 information 116 defining the underlying event (e.g., information 116 indicating whether the corresponding gift-giving event is a birthday party, holiday party, wedding reception, wedding shower, baby shower, or the like). Accordingly, if need be, a computer system may provide an appropriate context to one or more potential gift givers 16. Alternatively, or in addition thereto, a computer system may receive 114 information 118 identifying one or more potential gifts 14, information identifying 120 one or more potential gift givers 16, or the like or a combination or sub-combination thereto.

A computer system may receive 114 such information 116, 118, 120 in any suitable manner. In selected embodiments, the information 116, 118, 120 (or certain portions thereto) may be received via a website hosted on the Internet. Alternatively, or in addition thereto, the information 116, 118, 120 (or some portion thereof) may be received via a computing device in the possession of a recipient 12 (e.g., from an application running on such a computing device), via data entered by a clerk, teller, or the like within a store, via data collected by a scanner loaned by a store to the recipient 12 to enable the recipient 12 to shop a brick-and-mortar store and scan barcodes or UPCs corresponding to items he or she would like to list as part of the registry 10, or the like or a combination or sub-combination thereto.

In selected embodiments, at an appropriate time, a computer system may contact 122 one or more potential gift givers 16 to inform them of a gift registry 10 (e.g., provide information about a gift registry 10). Such contact may be made in any suitable manner. The particular manner used for each such potential gift giver 16 may depend on certain information or conditions corresponding to each potential gift giver 16. For example, if a potential gift giver 16 is known by an email address, then an email message (e.g., an email message containing one or more hyperlinks, directions, unique names, unique codes, or the like or a combination or sub-combination thereof) may be used to contact 122 that person. Alternatively, if a potential gift giver 16 is known by a mobile telephone number, then a push notification or a message directed to an appropriate application running on a corresponding computing device may be used to contact 122 the potential gift giver 16.

Figure 8:
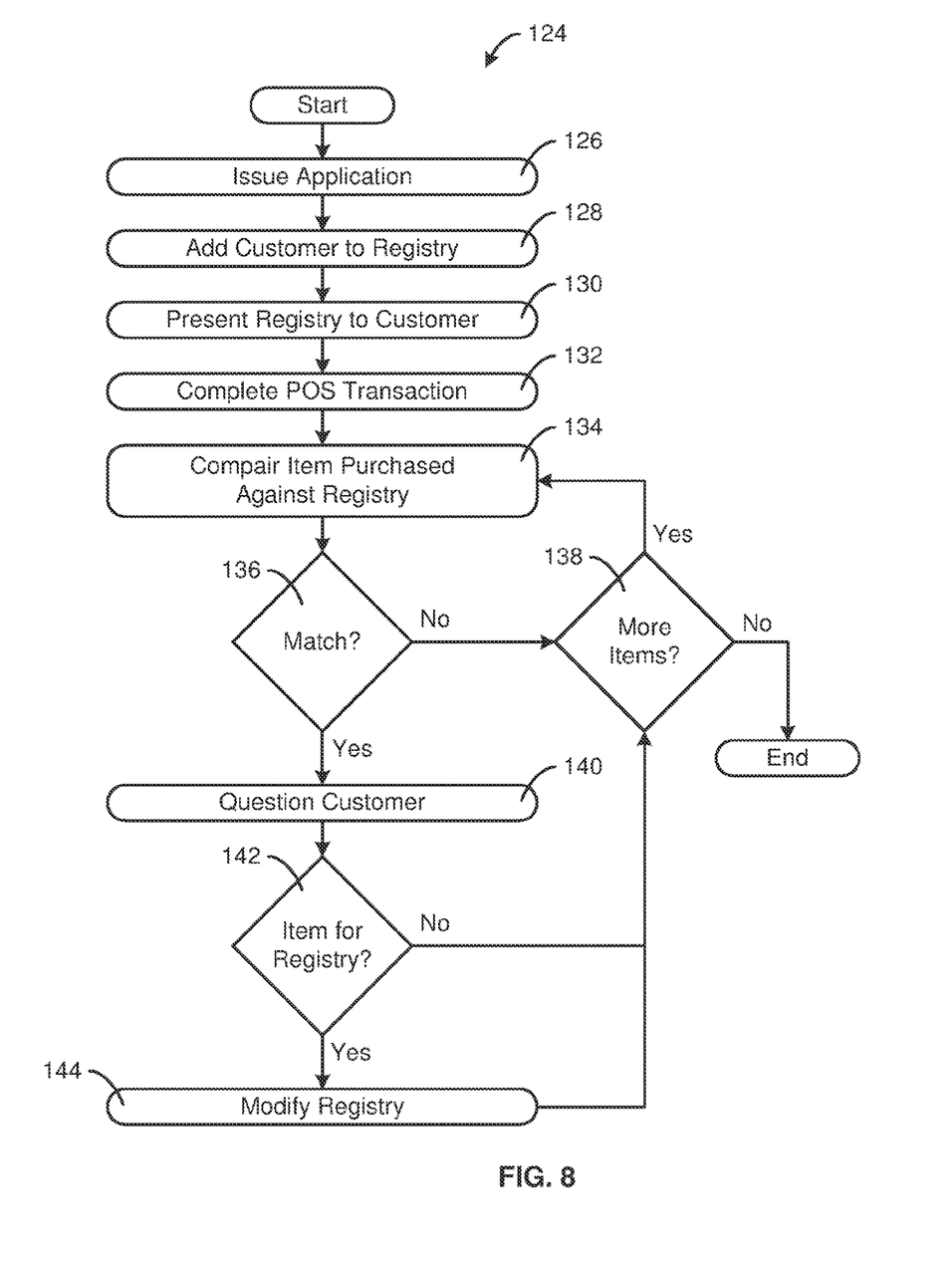
FIG. 8 is a block diagram of one embodiment of a method for using and updating a gift registry in accordance with the present invention.

Referring to FIG. 8, one method 124 in accordance with the present invention may begin when an appropriate application (e.g., a retailer's mobile application, an electronic receipts application, a gift registry application, or the like or a combination or sub-combination thereof) is issued 126 and installed on a computing device of a potential gift giver 16. The potential gift giver 16 may then be registered with respect to or on a computer system. This may result in the computing device being linked 128 to or associated 128 with a particular gift registry 10. Accordingly, certain information (e.g., a list of potential gift items 14) corresponding to the particular gift registry 10 may be presented 130 to an appropriate potential gift giver 16.

So prepared, a potential gift giver 16 may then enter a "brick-and-mortar" business location (e.g., enter a brick-and-mortar retail store with his or her computing device), select one or more items for purchase, and approach a POS system 22. At the POS system 22, a transaction (e.g., a purchase of one or more items) may be completed 132.

With the completion 132 of a transaction, receipt data 60 may be processed in any suitable manner. In selected embodiments, such processing may include passing receipt data 60 to a computing device of the potential gift giver 16 (e.g., passing receipt data 60 to an appropriate application running on a computing device of the potential gift giver 16). Additionally, such processing may include comparing 134 a first item purchased against the potential gift items 14 of any gift registry 10 to which the potential gift giver 16 may pertain. A comparison 134 may identify any matches 136 between the one or more items purchased in the recently completed transaction and any gift registry pertaining to the potential gift giver 16. This may be an initial step in determining whether any items should be removed from a gift registry 10.

If a comparison 134 reveals no match 136, and no more items 138 need to be compared 134, then a method 124 may end. Conversely, if a comparison 134 reveals no match 136, and one or more items 138 need to be compared 134, then a method 124 may continuation with the comparison 134 of the next item forming part of the transaction. When a match 136 is identified, a computer system may make 140 one or more additional inquiries. For example, if "Item A" was purchased as part of the transaction and is also listed in "Gift Registry B" to which the potential gift giver 16 pertains, then the computer system may question 140 (e.g., via an appropriate application running on his or her computing device) whether Item A was purchased for Gift Registry B. If the potential gift giver 16 response in the affirmative, then Gift Registry B may be updated 142 accordingly. Conversely, if the potential gift giver 16 response in the negative, then the method 124 may continue on to the next step (e.g., a determination of whether any more items 138 need to be compared 134).

An update 142 to a gift registry 10 may take any suitable form. In selected embodiments, an update may comprise the removal (e.g., the change in status) of the purchased item from a corresponding gift registry 10. Accordingly, when that particular gift registry 10 is view by other potential gift givers 16, they will not see the purchased item. Alternatively, the potential gift givers 16 may see the purchased item listed as part of the gift registry 10. However, the fact that the item has been purchased may be clearly communicated.

Additionally, in certain embodiments, notifications (e.g., notifications issued in real time) may be used to inform potential gift givers 16 that a particular purchase has been made. For example, when a certain item is purchased for a particular gift registry 10 by a first potential gift giver 16, a notification (e.g., a push notification) may be sent in real time to the other potential gift givers 16 informing them that the certain item has been purchased and, in certain embodiments, by whom. In selected embodiments, potential gift givers 16 may be able to (e.g., via one or more setting of an appropriate application) opt in or out of receiving such notifications.

The flowcharts in FIGS. 7 and 8 illustrate the architecture, functionality, and operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for administering a gift registry, the method comprising:
   creating, by a computer system corresponding to a retailer, a gift registry identifying one or more products that a first customer would like to receive as gifts;
   generating, by the computer system, a record designating a second customer as a potential participant in the gift registry;
   initiating, by the computer system after the generating, a transaction comprising the sale by the retailer of an item to the second customer;
   determining, by the computer system after the initiating, that the item was purchased by the second customer as a gift for the first customer, the determining comprising
      using, by the computer system, the record to identify the second customer as a potential participant in the gift registry,
      determining, by the computer system, that the item is a product of the one or more products listed within the gift registry, sending, by the computer system, a query to a computing device of the second customer inquiring whether the second customer purchased the item for the first customer, and receiving, by the computer system from the computing device, confirmation that the item was purchased for the first customer; and modifying, by the computer system, the gift registry to indicate that the product has been purchased.

2. The method of claim 1, further comprising receiving the second customer within a brick-and-mortar location.

3. The method of claim 2, wherein the initiating comprising initiating the transaction at a point-of-sale system contained within the brick-and-mortar location.

4. The method of claim 3, wherein the point-of-sale system forms at least a part of the computer system.

5. The method of claim 4, wherein the computing device comprises a mobile telephone.

6. The method of claim 5, wherein the determining that the item was purchased by the second customer as a gift for the first customer further comprises receiving, by the point-of-sale system from the customer as part of the transaction, a telephone number corresponding to the mobile telephone.

7. The method of claim 6, wherein the modifying comprises removing the product from the gift registry.

8. The method of claim 1, wherein the creating comprises generating, by the computer system, a machine-readable code encoded with data identifying the gift registry.

9. The method of claim 8, wherein the generating the record comprises receiving, by the computer system from the computing device, data extracted from the machine-readable code.

10. A method for administering a gift registry, the method comprising:

creating, by a computer system corresponding to a retailer, a gift registry identifying one or more products that a first customer would like to receive as gifts;

initiating and completing, by a point-of-sale system forming part of the computer system, a transaction comprising the sale by the retailer of an item to a second customer;

determining, by the computer system after the initiating, that the item is a product of the one or more products listed within the gift registry;

sending, by the computer system after the determining, a query to a mobile device possessed by the second customer inquiring whether the second customer purchased the item for the first customer;

receiving, by the computer system from the mobile device after the sending, confirmation that the item was purchased for the first customer; and modifying, by the computer system after the receiving, the gift registry to indicate that the product has been purchased.

11. The method of claim 10, further comprising linking, by the computer system, the gift registry to a mobile device possessed by a third customer.

12. The method of claim 11, further comprising serving, by the computer system after the modifying, an updated version of the gift registry to the mobile device possessed by the third customer.

13. The method of claim 12, wherein the transaction comprises receiving, by the point-of-sale system from the second customer, a telephone number corresponding to the mobile device possessed by the second customer.

14. The method of claim 13, further comprising receiving the second customer within a brick-and-mortar location.

15. The method of claim 14, wherein the initiating comprising initiating the transaction at the point-of-sale system contained within the brick-and-mortar location.

16. The method of claim 10, further comprising generating, by the computer system, a machine-readable code encoded with data identifying the gift registry.

17. The method of claim 16, further comprising receiving, by the computer system from the mobile device prior to the initiating, data extracted from the machine-readable code.

18. A computer system comprising:

one or more processors;

one or more memory devices operably connected to the one or more processors; and the one or more memory devices collectively storing a data store containing records corresponding to a gift registry, the records identifying one or more products that a customer would like to receive as gifts from one or more friends or relatives thereof, a distribution module programmed to link a plurality of mobile computing devices to the gift registry, each mobile computing device of the plurality of mobile computing devices corresponding to a different friend or relative of the one or more friends or relatives, a comparison module programmed to identify within one or more point-of-sale transactions involving any of the one or more friends or relatives one or more matching items, each matching item thereof being a product of the one or more products listed within the gift registry, the comparison module further programmed to query one or more of the plurality of mobile computing devices to determine whether the one or more matching items were purchased for the gift registry, and an update module programmed to update the gift registry in accordance with purchases made therefor.

19. The computer system of claim 18, wherein the one or more memory devices further collectively store a registration module programmed to collect information corresponding to the gift registry and pass the information to the data store for storage.

20. The computer system of claim 18, wherein the distribution module is further programmed to send an electronic message to each mobile computing device of the plurality of mobile computing devices, the electronic message comprising an invitation to join the gift registry.

* * * * *